J. A. CLARK.
RAKE.
APPLICATION FILED MAR. 29, 1921.
1,419,022.
Patented June 6, 1922.
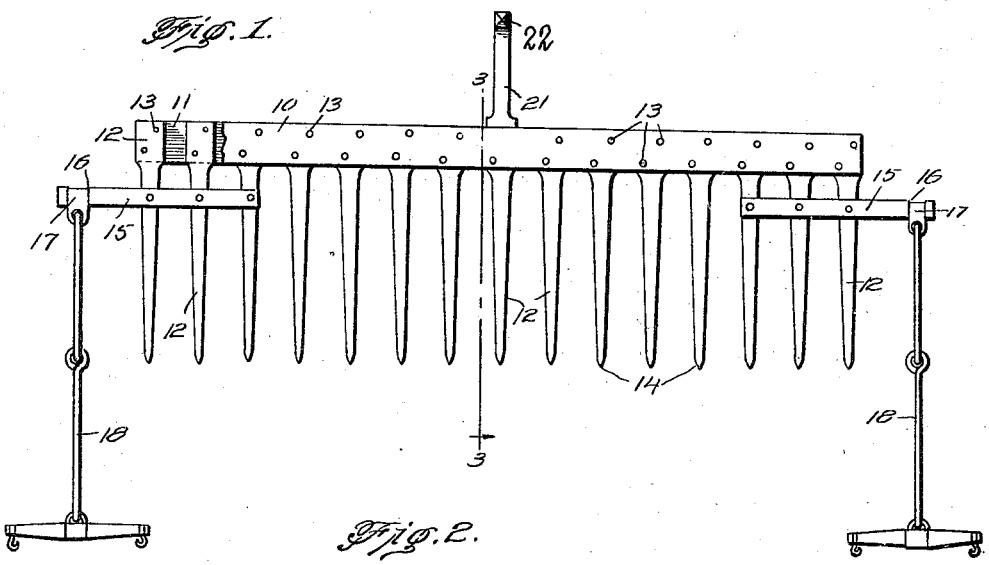
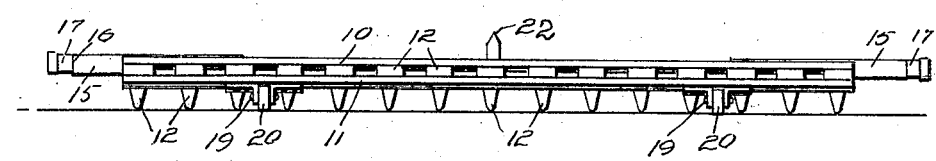
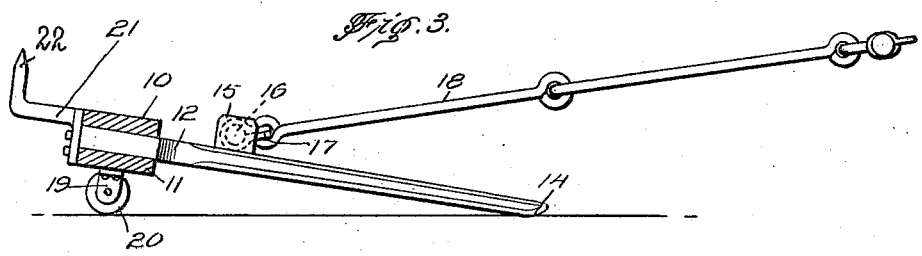
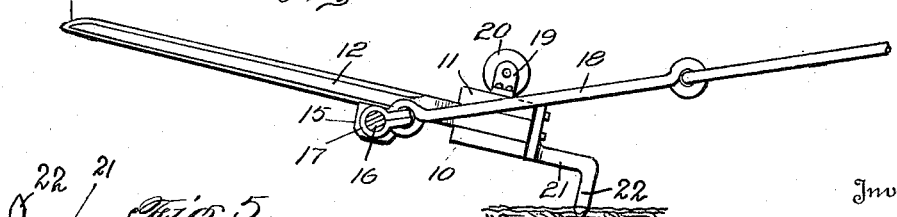
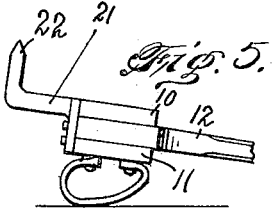
Inventor
J. A. Clark.
By
Geo. P. Kimmel.
Attorney

UNITED STATES PATENT OFFICE.

JAMES A. CLARK, OF THORNDALE, TEXAS.

RAKE.

1,419,022.  Specification of Letters Patent.  Patented June 6, 1922.

Application filed March 29, 1921. Serial No. 456,585.

*To all whom it may concern:*

Be it known that I, JAMES A. CLARK, a citizen of the United States, residing at Thorndale, in the county of Milam and State of Texas, have invented certain new and useful Improvements in a Rake, of which the following is a specification.

This invention relates to improvements in raker devices for gathering products or material from the ground, such as hay, straw, trash or the like, and has for one of its objects to provide a device of this character which may be automatically overturned to discharge its load and then immediately automatically restored to receiving position.

With these and other objects in view the invention consists of certain novel features of construction as hereinafter shown and described and then specifically pointed out in the claims, and in the drawings illustrative of the preferred embodiment of the invention.

Figure 1 is a plan view of the improved device.

Fig. 2 is a rear elevation with the device in operative or gathering position.

Fig. 3 is an end elevation enlarged with the device shown in operative or gathering position.

Fig. 4 is a view similar to Fig. 3 showing the parts in position to be returned to load receiving position.

Fig. 5 is a detail illustrating a modification in the construction.

The improved apparatus comprises a head member formed of coacting plates or bars 10 and 11 with a plurality of raker teeth 12 in spaced relation and disposed at their rear ends between the bars and secured by nails or like fastening devices 13.

At their free ends the teeth are pointed and with the sides which initially engage the ground curved as shown at 14, so that they will not penetrate the ground and produce preliminary overturn motion during the raking operation, while at the same time the teeth 12—14 will penetrate the ground if the head member 10 is elevated by force applied upwardly to the member 21.

Attached to the teeth 12 which are nearest the ends are supports 15 transversely of the teeth and spaced from the head members. The supporting members extend beyond the terminal teeth and are provided with journals 16 to receive clip devices 17 rotative on the journals. The clip devices are designed to receive the rear ends of suitable draft appliances represented conventionally at 18. It will be noted that the draft appliances are located at the opposite ends of the raker and the draft animals do not walk on the material which is to be engaged by the rake.

Attached to the lower side of the head member 11 are hangers 19 carrying bearing rollers 20, and thus supporting the head members above the ground.

Attached to the head member 11 and one of the teeth 12 is a combined handle and overturning member 21, preferably directed rearwardly of the head members 10 and 11, with an offset point 22 to engage the ground when the raker is overturned, to restore the raker to receiving position.

The head members 10 and 11 and teeth 12 are preferably of wood, of suitable strength to stand the strain to which they will be subjected, while the members 15 may also be of wood or of metal as may be preferred.

With a device thus constructed the operation of the device is as follows:—

The parts are arranged initially as shown in Fig. 3, with the forward end 14 of the teeth 12 bearing upon the ground, and the head member 10—11 held in elevated position by the carrier wheel 20. The device is then drawn over the ground to gather the load which it is designed to carry, and which may be hay, or other product or commodity, and when the load has been gathered the operator grasps the handle 21 and elevates the member 10 until the point 14 engages the ground and penetrates the same and overturns the rake and disposes it in the position shown in Fig. 4, with the point 22 of the member 21 penetrating the soil, and as the forward movement of the draft appliance continues the rake is overturned and restored to load receiving position.

The wheel device 20 may be dispensed with and a simple shoe employed for that purpose as illustrated in Fig. 5, and it is not desired therefore to limit the invention to the employment of a wheel 20.

The improved device is simple in construction, can be inexpensively manufactured and of any required size and capacity.

The preferred embodiment of the invention is disclosed in the drawings and set forth in the specifications, but it will be understood that any modifications within the scope of the claim may be made in the construction without departing from the principle of the invention or sacrificing any of its advantages.

Having thus described the invention what is claimed as new is:—

1. In a rake of the class described, a head member, a plurality of teeth extending from the head member in spaced relation, supports attached to the teeth in advance of the head member and extending beyond the end teeth, means for coupling draft appliances respectively to the extended portions of said supports, a bearing device depending from one side of said head member and a combined handle and overturning member attached to the head member at the side adjacent to the bearing device.

2. In a rake of the class described, a head member, a plurality of teeth extending from the head member in spaced relation, supports attached to the teeth in advance of the head member and extending beyond the end teeth, means for coupling draft appliances respectively to the extended portions of said supports, bearing rollers mounted upon one face of said head member, and a combined handle and overturning member attached to the head member at the side adjacent the bearing rollers.

3. In a rake of the class described, a head member, a plurality of teeth extending from the head member in spaced relation, supports attached to the teeth in advance of the head member and extending beyond the end teeth, said supports having journals at their ends, clip devices engaging said journals and rotative thereon, draft appliances coupled to said clips, and a combined handle and overturning member attached to the head member at the side adjacent the supports.

In testimony whereof, I affix my signature hereto.

JAMES A. CLARK.